(12) United States Patent
Holtwick et al.

(10) Patent No.: US 7,735,521 B2
(45) Date of Patent: Jun. 15, 2010

(54) VALVE ARRANGEMENT, PARTICULARLY FOR SPRAY DAMPING UNITS FOR PRINTING MACHINES

(75) Inventors: Robert Holtwick, Telgte (DE); Michael Baldy, Steinfurt (DE); Uwe Glaus, Düsseldorf (DE); Daniel Nussbaum, Düsseldorf (DE)

(73) Assignees: Technotrans AG, Sassenberg (DE); A.u.K. Muller GmbH & Co. KG, Dusseldorf (DE)

( * ) Notice: Subject to any disclaimer, the term of this patent is extended or adjusted under 35 U.S.C. 154(b) by 207 days.

(21) Appl. No.: 11/549,700

(22) Filed: Oct. 16, 2006

(65) Prior Publication Data

US 2007/0108399 A1 May 17, 2007

(30) Foreign Application Priority Data

Oct. 14, 2005 (DE) ........................ 10 2005 049 722

(51) Int. Cl.
*F16K 35/00* (2006.01)
(52) U.S. Cl. ..................... 137/884; 137/271; 137/454.5
(58) Field of Classification Search ................. 137/271, 137/270, 884, 454.5, 454.2

See application file for complete search history.

(56) References Cited

U.S. PATENT DOCUMENTS

| 222,869 | A | | 12/1879 | Clark |
| 2,958,547 | A | | 11/1960 | Batts et al |
| 3,117,587 | A | * | 1/1964 | Willinger ............... 137/315.11 |
| 3,739,804 | A | * | 6/1973 | Dubreuil ..................... 137/269 |
| 4,078,574 | A | * | 3/1978 | Kosarzecki ................. 137/269 |
| 5,322,518 | A | * | 6/1994 | Schneider et al. ........... 604/247 |
| 5,595,116 | A | * | 1/1997 | Ohkawara .................... 101/147 |
| 6,319,297 | B1 | * | 11/2001 | Fosnight ...................... 55/318 |
| 6,460,826 | B1 | * | 10/2002 | Rezvani ...................... 251/291 |

FOREIGN PATENT DOCUMENTS

| DE | 93 20 944 U1 | 6/1995 |
| DE | 10247778 A1 | 5/2003 |
| EP | 0325381 B1 | 7/1989 |
| GB | 2084902 A | 4/1982 |
| JP | 05330009 A | 12/1993 |

* cited by examiner

*Primary Examiner*—Kevin L Lee
(74) *Attorney, Agent, or Firm*—Richard M. Goldberg

(57) ABSTRACT

Valve arrangement for spray damping units of printing machines with at least one valve for controlling a flow of liquid, in which the valve includes a housing with an inlet and outlet, into which a valve body arrangement is inserted with the help of a fast-action closure.

3 Claims, 4 Drawing Sheets

VALVE ARRANGEMENT, PARTICULARLY FOR SPRAY DAMPING UNITS FOR PRINTING MACHINES

BACKGROUND OF THE INVENTION

This invention relates to a valve arrangement, particularly for spray damping units for printing machines, with at least one valve for controlling a flow of liquid.

In offset printing a damping agent, usually water with additives of alcohol and a number of other fluid substances, is applied to the areas of the printing cylinders where adhesion of the printing ink is to be prevented. Relatively complicated systems with a large number of valves are used to ensure precise control of the supply of damping agent.

Valves are wear parts with relatively high maintenance requirements. A defect in one or more valves may put the printing machine in question out of operation. Furthermore, the valves used are generally of a relatively complicated construction, requiring special tools for disassembly purposes whenever a valve has to be serviced or replaced. All this leads to undesirable downtimes.

A similar situation arises in other cases in which a large number of liquid flows have to be applied on a targeted basis, so that the application of one damping agent, as in this case, is to be understood merely as an example. In the printing industry in particular there are numerous other possible applications, including, for example, the application of printing ink, or of cleaning agents for the printing cylinders, etc.

SUMMARY OF THE INVENTION

This invention is based on the task of achieving a substantial reduction in the time required for the maintenance and changeover of valves.

By way of a solution, the valve arrangement according to the invention is characterised in that the valve comprises a housing with an inlet and an outlet, into which a valve body arrangement is inserted with the help of a fast-action closure.

Thus, according to the invention, a valve housing is provided into which the entire valve mechanism with all its mobile, wear-susceptible parts can be inserted as a whole unit.

Insofar as one is referring here to a fast-action closure used to affix the valve body arrangement inside the housing, a bayonet closure, screw closure, latch connection or similar are all conceivable.

Above all, the intention is that the valve body arrangement can be removed and inserted without tools, or at least without special tools.

BRIEF DESCRIPTION OF THE DRAWINGS

Preferred embodiments of the invention will be described in more detail below with reference to the enclosed drawing.

DETAILED DESCRIPTION

Figure 1:
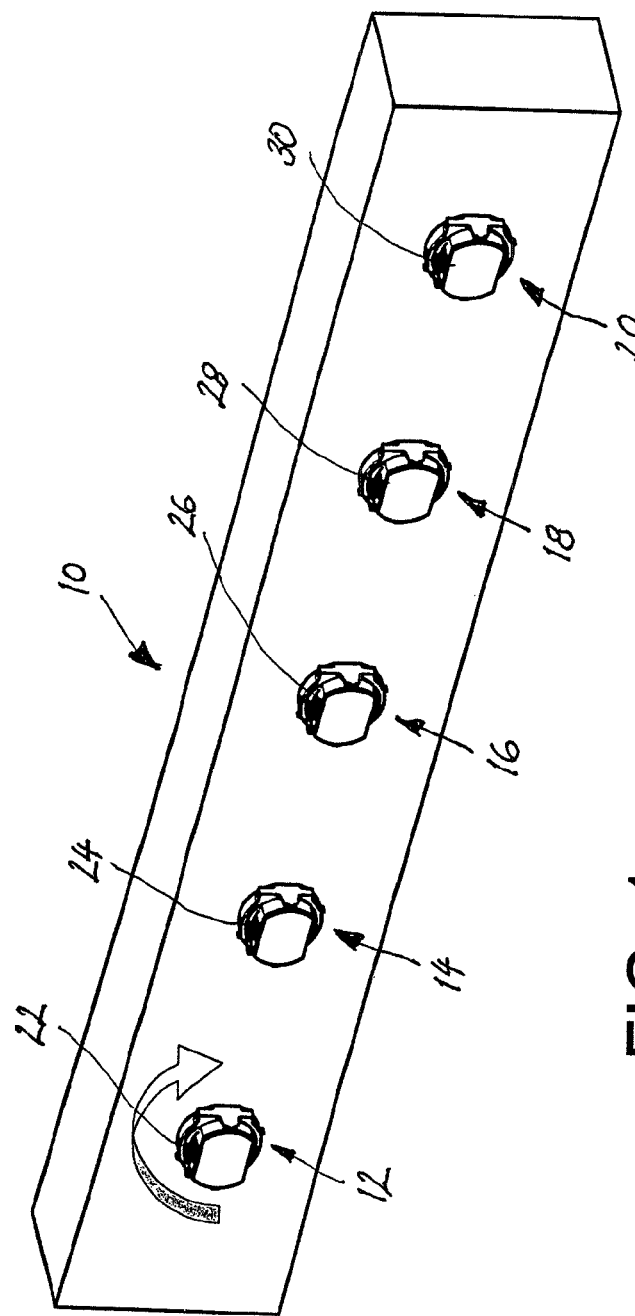
FIG. 1 is a perspective view of an embodiment of a valve arrangement according to the invention.
Figure 1:
Figure 2:
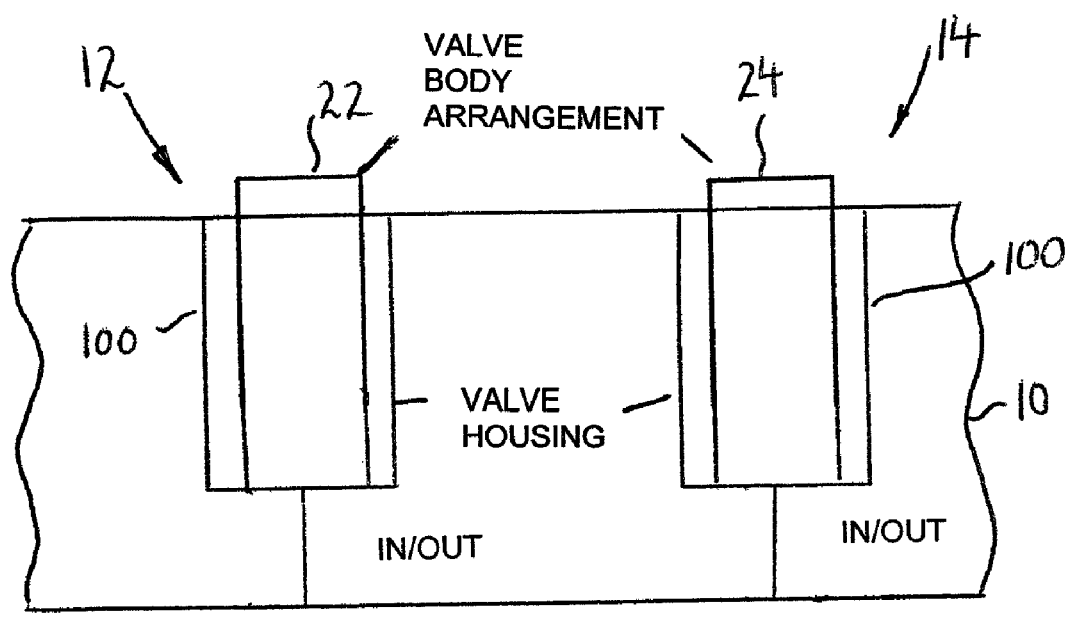
FIG. 2 is a schematic sectional view of a portion of the valve arrangement of FIG. 1.
Figure 3:
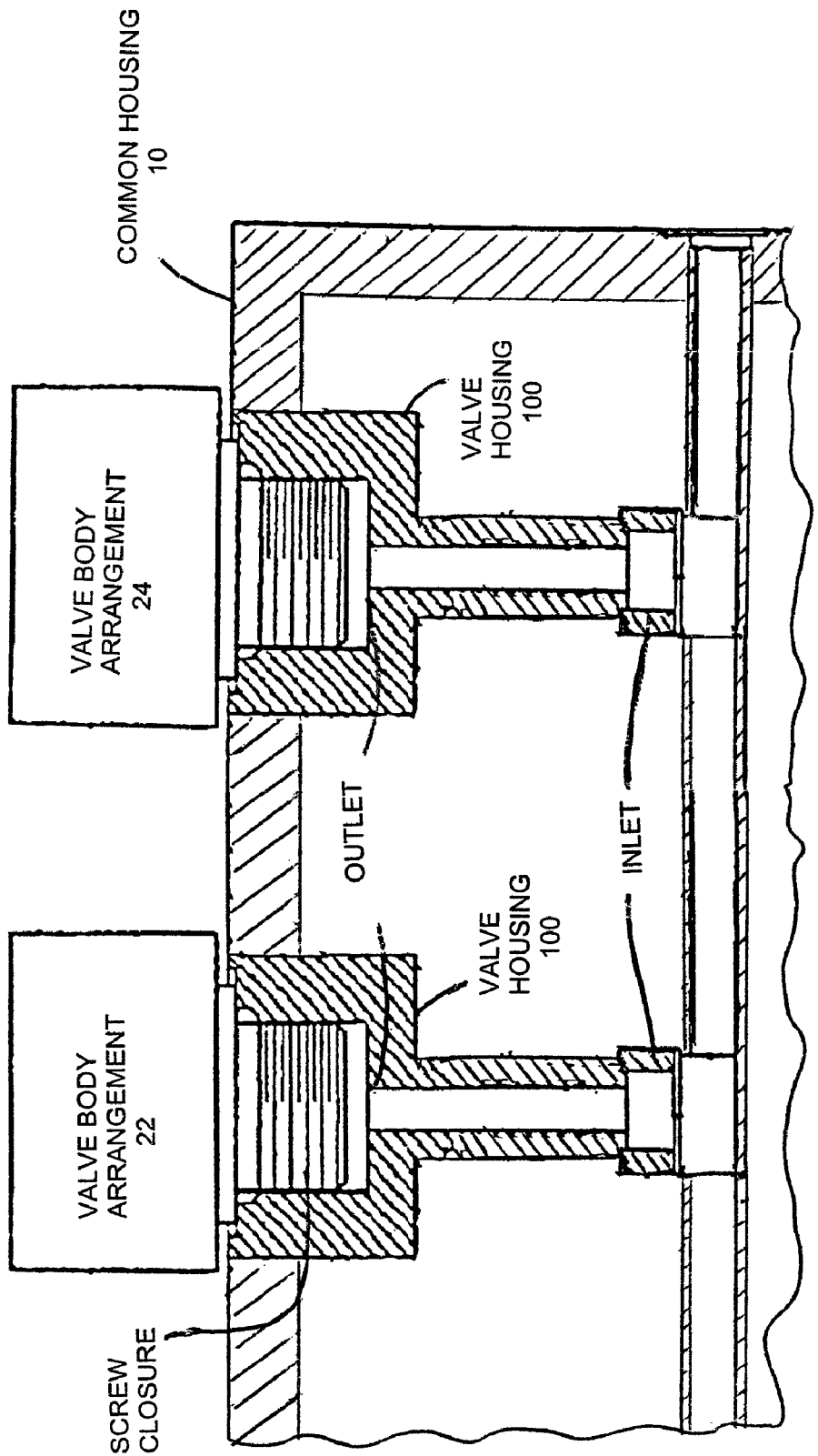
FIG. 3 is a cross-sectional view of a portion of the valve arrangement of FIG. 1 with a screw closure.
Figure 4:
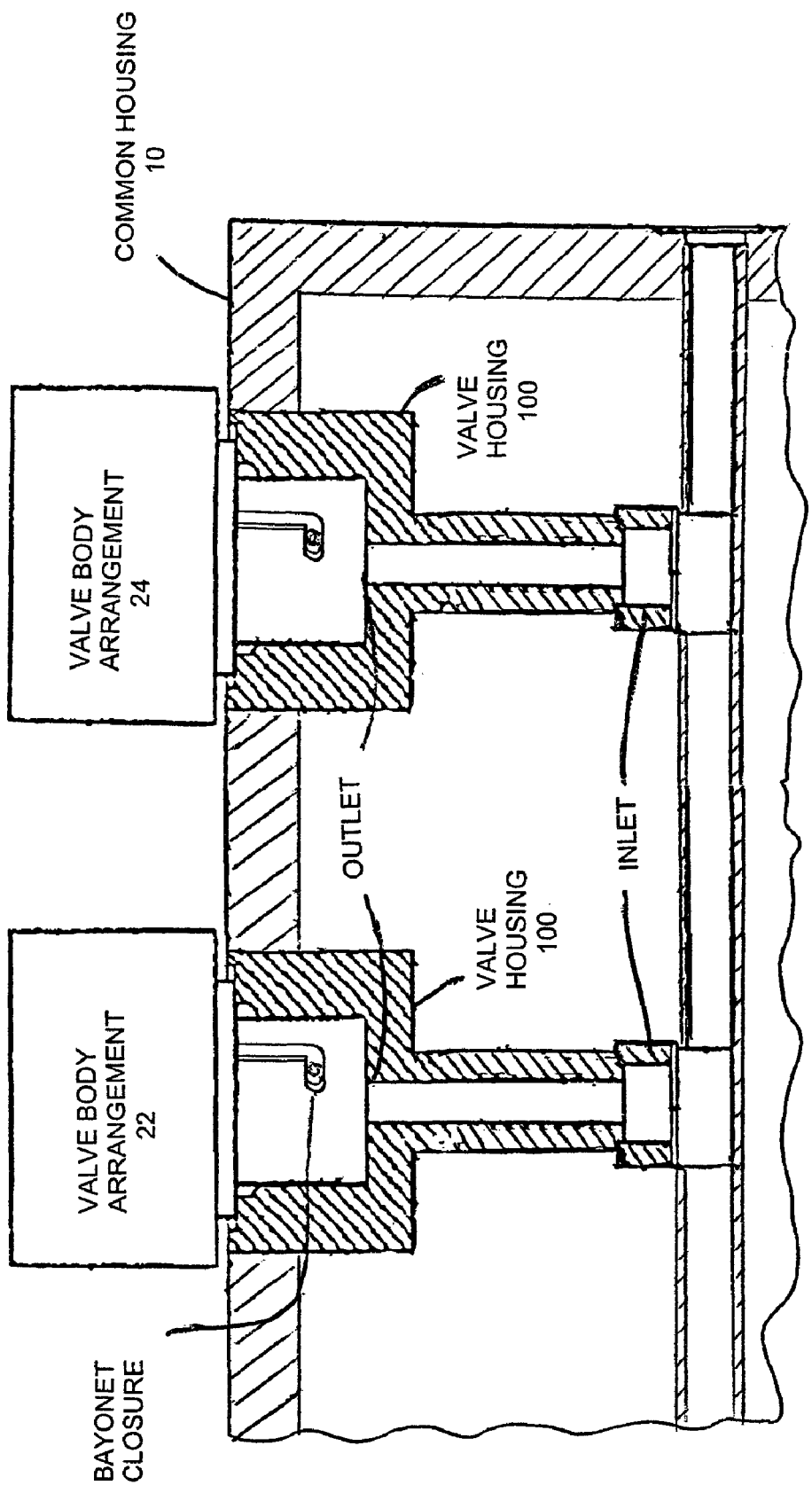
FIG. 4 is a cross-sectional view of a portion of the valve arrangement of FIG. 1 with a bayonet closure.

The drawing shows only a diagrammatic view of the valve arrangement according to the invention. It comprises an elongated housing 10, shaped like a box in the example shown, which accommodates valve housings 100 for five, valves 12,14,16,18,20. Whereas the valve housings are hidden inside housing 10, the valve body arrangements 22,24,26,28,30 inserted in the valve housings can be seen along the front face of housing 10. As illustrated by the example of valve arrangement 22, the valve body arrangements 22,24,26,28,30 can be quickly and easily extracted from their respective valve housings with the aid of a fast-action closure, without tools. All the required connections, sealings, etc., are located in the valve housings or on the valve body arrangements.

The valves are contrived so that when valve body arrangement 22 is inserted in the associated valve housing, all the necessary connections and sealings are produced automatically.

A substantial advantage of this construction method is that a valve body arrangement can easily be removed as a whole and replaced by another, whilst the defect arrangement can be examined outside the printing machine without further interruption to printing operations.

The valve arrangement does not require any complicated assembly work. This keeps downtimes short. All mobile and wear-susceptible parts are located on the removable valve body arrangement which can be serviced or repaired outside the printing machine and without interruption to printing operations.

Thus the valve body arrangements can, for example, comprise all movable valve bodies and seats, and furthermore, all actuating devices such as electromagnets, pneumatic cylinders and similar.

The valve body connections further comprise a connection for the inlets and outlets, which can be connected inside their respective valve housings.

The invention claimed is:

1. Valve arrangement for spray damping units of printing machines, comprising:
    a common housing,
    a plurality of valve housings, each having an inlet and an outlet, each valve housing disposed in the common housing,
    a plurality of valve body arrangements, each including all mobile and wear susceptible parts of a valve and removably securable into a respective said valve housing with the help of a fast-action closure, for controlling a flow of liquid.

2. Valve arrangement according to claim 1, wherein the fast-action closure includes a bayonet closure.

3. Valve arrangement according to claim 1, wherein the fast-action closure includes a screw closure.

* * * * *